UNITED STATES PATENT OFFICE.

TREVOR MUNFORD CAVEN, OF BALTIMORE, MARYLAND, ASSIGNOR TO MARYLAND PRODUCTS COMPANY, A CORPORATION OF MARYLAND.

DIATOMACEOUS MATERIAL AND PROCESS OF MAKING THE SAME.

1,247,503.  Specification of Letters Patent.  Patented Nov. 20, 1917.

No Drawing.  Application filed November 4, 1916. Serial No. 129,589.

*To all whom it may concern:*

Be it known that I, TREVOR M. CAVEN, a citizen of the United States and resident of Baltimore, Maryland, have invented certain new and useful Improvements in Diatomaceous Material and Processes of Making the Same, of which the following is a specification.

It is the object of my invention to provide a filtering or insulating material from kieselguhr, otherwise known as diatomaceous silica or infusorial earth, which as a mass has no very appreciable tenacity and is not naturally plastic, the invention being capable of embodiment in various shapes, tubular or otherwise, according to the requirements of the particular article to be produced.

With my invention an article is provided composed of diatomaceous material having the highest possible degree of tenacity and any desired degree of porosity.

Further, it is my purpose to produce a diatomaceous silica material which after being calcined retains its value as a filtering medium, and also as an insulating material.

In carrying out the invention I take a suitable quantity of diatomaceous silica and grind it in the presence of water, the material then being in a plastic state or more specifically stated in a colloidal or semicolloidal condition. I also take a suitable quantity of diatomaceous material and thoroughly mix it with combustible matter in a divided state, such as is well known in this art, the particles of which are of a size adapted to give to the complete article or material its desired degree of porosity. These two masses of diatomaceous material, the one in plastic or colloidal or semi-colloidal condition and the other having the combustible matter thoroughly distributed through it, are then mixed together, the colloidal or semi-colloidal material serving as a binder for the other mass which in turn acts as a filler. The resultant or combined material is now of the desired plasticity to be put through forming dies for the formation of tubular articles or the material may be made to assume any desired shape, according to the uses to be met, and after which this resultant material is calcined.

The calcining action on the material is carried to the point where the colloidal material is completely fused but notwithstanding this the desired porosity of the material is attained by the burning out of the combustible matter distributed through the same, the result being that the highest possible degree of tenacity may be secured in the diatomaceous product with any desired degree of porosity, the complete fusion of the colloidal material and consequent tenacity being entirely independent of the degree of porosity. Without the presence of the combustible matter distributed through the mass of diatomaceous silica the fusion of the colloidal material would largely destroy the natural porosity of the material.

It may be pointed out further that while the natural kieselguhr will not fuse, excepting at a very high temperature, say 2960° F. the colloidal material will fuse at about 1100° F.

In transforming the diatomaceous silica from its natural state into that suitable to act as a binder a certain percentage of water is added and the wet mass is ground long enough to secure the change desired for acting as a binder for the other mass of said diatomaceous silica mixed with the combustible matter, as above mentioned. The combustible material which is added to the mass may be any ordinarily employed for giving the mass porosity by calcining such as sawdust mentioned in my Patent No. 1,139,637, May 18, 1915.

What I claim is:—

1. The herein described product consisting of unfused diatomaceous material having artificial porosity and held together by a binder of the same material in a fused state.

2. The herein described process consisting in incorporating with diatomaceous silica combustible matter in a divided state, and then calcining the mixture until the said combustible matter is burned out and until only a portion of the diatomaceous material is completely fused to produce a product having porosity and the highest degree of tenacity, substantially as described.

3. The herein described process consisting in transforming a quantity of diatomaceous silica from its natural state into a plastic state suitable to act as a binder, mixing it with another quantity of said natural diatomaceous silica, combustible matter in a divided condition, then mixing the plastic diatomaceous material with the mixture having the combustible matter distributed therethrough and calcining the resultant material to a point where complete fusion of only the plastic diatomaceous silica takes place and the combustible matter is burned out to leave the product porous, substantially as described.

TREVOR MUNFORD CAVEN.